US012230886B2

(12) United States Patent
Liao et al.

(10) Patent No.: US 12,230,886 B2
(45) Date of Patent: Feb. 18, 2025

(54) LOW BAND ANTENNA DEVICE

(71) Applicant: ASUSTeK COMPUTER INC., Taipei (TW)

(72) Inventors: Sung-Mao Liao, Taipei (TW); Chien-Ming Hsu, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 149 days.

(21) Appl. No.: 17/981,607

(22) Filed: Nov. 7, 2022

(65) Prior Publication Data

US 2024/0014575 A1 Jan. 11, 2024

(30) Foreign Application Priority Data

Jul. 11, 2022 (TW) .................................. 111125976

(51) Int. Cl.
*H01Q 21/30* (2006.01)
*H01Q 1/24* (2006.01)

(52) U.S. Cl.
CPC ............. *H01Q 21/30* (2013.01); *H01Q 1/243* (2013.01)

(58) Field of Classification Search
CPC ........ H01Q 21/30; H01Q 1/243; H01Q 5/335; H01Q 1/521; H01Q 21/28
See application file for complete search history.

(56) References Cited

U.S. PATENT DOCUMENTS

| | | | | |
|---|---|---|---|---|
| 11,038,259 | B2 | 6/2021 | Li et al. | |
| 11,115,511 | B1 | 9/2021 | Ghaemi et al. | |
| 2018/0366813 | A1* | 12/2018 | Kim | H01Q 9/04 |
| 2021/0318720 | A1* | 10/2021 | Lin | H01Q 1/243 |
| 2022/0123469 | A1* | 4/2022 | Hsu | H01Q 9/42 |
| 2022/0182473 | A1* | 6/2022 | Klomsdorf | H01Q 1/08 |
| 2022/0416404 | A1* | 12/2022 | Harper | H01Q 1/241 |

FOREIGN PATENT DOCUMENTS

| | | | |
|---|---|---|---|
| CN | 212517532 | U | 2/2021 |
| CN | 112243052 | B | 10/2021 |

* cited by examiner

*Primary Examiner* — Seung H Lee
(74) *Attorney, Agent, or Firm* — McClure, Qualey & Rodack, LLP

(57) ABSTRACT

The disclosure provides a low band antenna device, arranged on a folding screen electronic device, and the folding screen electronic device includes a first casing and a second casing that are foldable. A first antenna and a second antenna are located on the first casing and separated, and a third antenna and a fourth antenna are located on the second casing and separated. The first antenna corresponds to the fourth antenna, and the second antenna corresponds to the third antenna. When the folding screen electronic device is in an open mode, the first through forth antennas all maintain a normal working state. When the folding screen electronic device is in a close mode, one of the first antenna and the fourth antenna and one of the second antenna and the third antenna maintain the normal working state, and the remaining antennas are in a detuned and disabled state.

6 Claims, 5 Drawing Sheets

LOW BAND ANTENNA DEVICE

CROSS-REFERENCE TO RELATED APPLICATION

The disclosure claims the priority benefit of Taiwan application serial No. 111125976, filed on Jul. 11, 2022. The entirety of the above-mentioned patent application is hereby incorporated by reference herein and made a part of the specification.

BACKGROUND OF THE INVENTION

Field of the Invention

The disclosure relates to a low band antenna device applied to a folding screen electronic device.

Description of the Related Art

With the evolution of wireless communication, there is demand for wireless network in various occasions. At present, the frequency bands of wireless networks are roughly divided into low frequency band, medium frequency band, and high frequency band. Since the low frequency band antenna requires a long antenna area, in the current mainstream antenna architecture of the handheld device, usually only medium frequency band and high frequency band are designed with four antennas, and the remaining area is limited to two low frequency band antennas. As a result, in the low frequency band (below 1 GHz), only 2*2 multi-input multi-output (MIMO) state is achieved, which fails to meet the increasing bandwidth requirements.

BRIEF SUMMARY OF THE INVENTION

According to an aspect of this disclosure, a low band antenna device is provided. The low band antenna device is arranged on a folding screen electronic device with a first casing and a second casing that are foldable. The low band antenna device includes a first antenna, a second antenna, a third antenna, and a fourth antenna. The first antenna is located on the first casing, and the second antenna is located on the first casing and kept separated from the first antenna. The third antenna is located on the second casing and corresponds to the second antenna, the fourth antenna is located on the second casing and kept separated from the third antenna, and the fourth antenna corresponds to the first antenna. When the folding screen electronic device is in an open mode, the first antenna, the second antenna, the third antenna, and the fourth antenna all maintain a normal working state; and when the folding screen electronic device is in a close mode, one of the first antenna and the fourth antenna and one of the second antenna and the third antenna maintain the normal working state, and the remaining antennas are in a detuned and disabled state.

In conclusion, in order to improve the transmission speed of mobile devices and increase the number of mobile phone antennas, the disclosure provides a low band antenna device, which upgrades the low band antenna to a 4*4 MIMO state, and uses the MIMO technology to maximize the throughput, so as to increase the mobile phone transmission throughput, meet the increasing bandwidth requirements, and optimize the user experience.

DETAILED DESCRIPTION OF THE EMBODIMENTS

Figure 1:
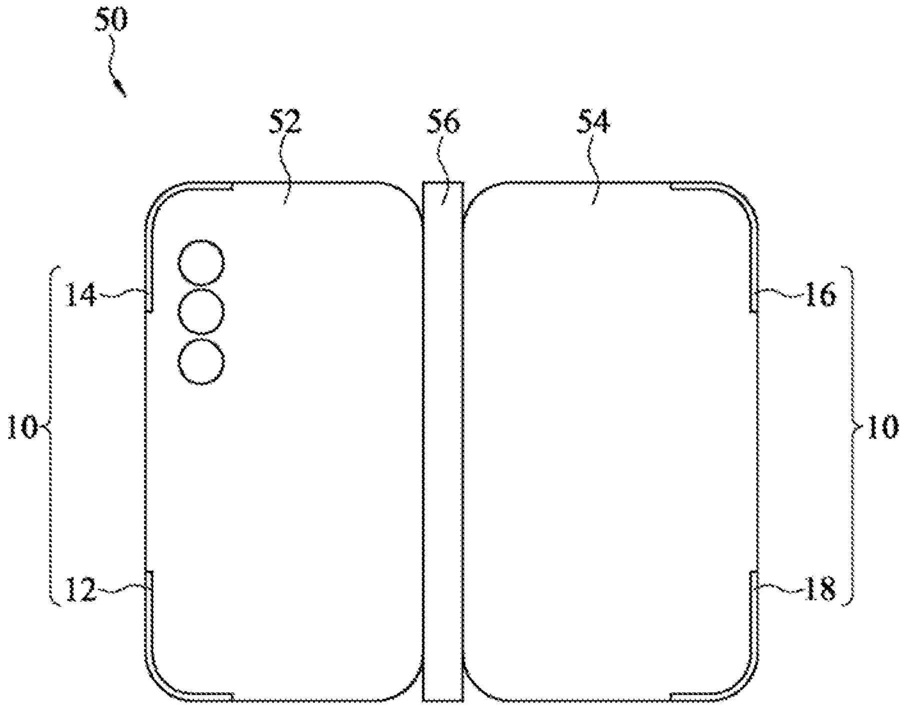
FIG. 1 is a schematic structural diagram of a folding screen electronic device in an open mode according to an embodiment of the disclosure.

Embodiments of the disclosure are described with reference to relevant drawings. In addition, some elements or structures are omitted in the drawings in the embodiments, to clearly show technical features of the disclosure. In the drawings, the same numerals represent the same or similar elements or circuits. It is to be understood that although the terms “first”, “second”, etc. are used herein to describe various elements, components, areas, or structures, these elements, components, areas, and/or structures are not limited by these terms. These terms are only used to distinguish one element, component, area, or structure from another element, component, area, or structure.

Figure 2:
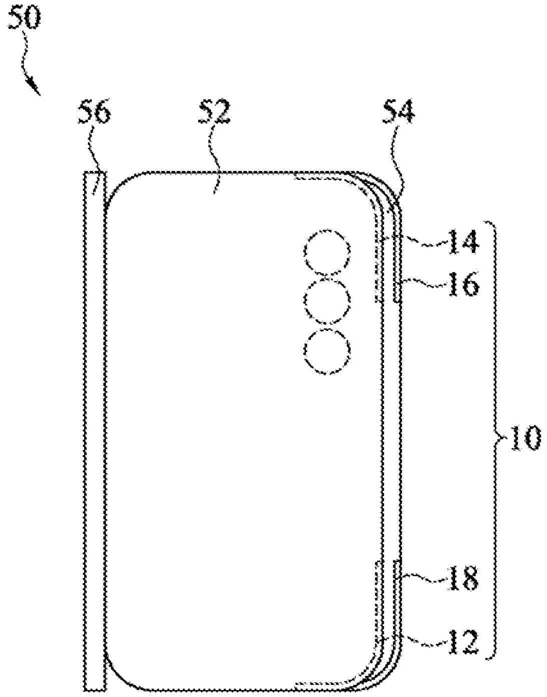
FIG. 2 is a schematic structural diagram of a folding screen electronic device in a close mode according to an embodiment of the disclosure.

Referring to FIG. 1 and FIG. 2 together, a low band antenna device 10 is arranged on a folding screen electronic device 50, the folding screen electronic device 50 includes a first casing 52 and a second casing 54 that are foldable, and the first casing 52 and the second casing 54 are combined together through a hinge 56, so that the first casing 52 and the second casing 54 are opened and present an open mode, or the first casing 52 and the second casing 54 are closed together and present a close mode. The low band antenna device 10 includes a first antenna 12, a second antenna 14, a third antenna 16, and a fourth antenna 18. The first antenna 12 is located on the first casing 52, and the second antenna 14 is also located on the first casing 52 and kept separated from the first antenna 12. The third antenna 16 is located on the second casing 54 and corresponds to the second antenna 14, the fourth antenna 18 is also located on the second casing 54 and kept separated from the third antenna 16, and the fourth antenna 18 corresponds to the first antenna 12. In this embodiment, the first antenna 12 and the second antenna 14 are respectively located on inner edges of two outer corners of the first casing 52, that is, the first antenna 12 is located on an inner edge of an outer corner of an upper end of the first casing 52, and the second antenna 14 is located on an inner edge of an outer corner of a lower end of the first casing 52; and the third antenna 16 and the fourth antenna 18 are respectively located on inner edges of two outer corners of the second casing 54, that is, the third antenna 16 is located on an inner edge of an outer corner of an upper end of the second casing 54, and the fourth antenna 18 is located on an inner edge of an outer corner of a lower end of the second casing 54. Therefore, with the hinge 56 as a center line, the first antenna 12 is symmetrical to the fourth antenna 18, and the second antenna 14 is symmetrical to the third antenna 16.

When the folding screen electronic device 50 is in the open mode, the first antenna 12, the second antenna 14, the third antenna 16, and the fourth antenna 18 all maintain a normal working state, to take advantage of the feature that the folding screen electronic device 50 has a larger area after being unfolded, so that the first antenna 12, the second antenna 14, the third antenna 16, and the fourth antenna 18 operate normally at four corners after unfolding. When the folding screen electronic device 50 is in the close mode, since the first antenna 12 and the fourth antenna 18 overlap with each other and the second antenna 14 and the third antenna 16 overlap with each other, one of the first antenna 12 and the fourth antenna 18 and one of the second antenna 14 and the third antenna 16 maintain the normal working state, and the remaining antennas are in a detuned and disabled state. In an embodiment, when the first antenna 12 and the third antenna 16 with the best efficiency are selected in the disclosure to maintain the normal working state, the remaining second antenna 14 and the remaining fourth antenna 18 are in the detuned and disabled state, to avoid interference with transmission and reception of wireless signals and maintain antenna efficiency when the folding screen electronic device 50 is closed. Similarly, when the first antenna 12 and the second antenna 14 with the best efficiency are selected in the disclosure to maintain the normal working state, the remaining third antenna 16 and the remaining fourth antenna 18 are in the detuned and disabled state; when the third antenna 16 and the fourth antenna 18 with the best efficiency are selected in the disclosure to maintain the normal working state, the remaining first antenna 12 and the remaining second antenna 14 are in the detuned and disabled state; and when the second antenna 14 and the fourth antenna 18 with the best efficiency are selected in the disclosure to maintain the normal working state, the remaining first antenna 12 and the remaining third antenna 16 are in the detuned and disabled state.

Figure 3:
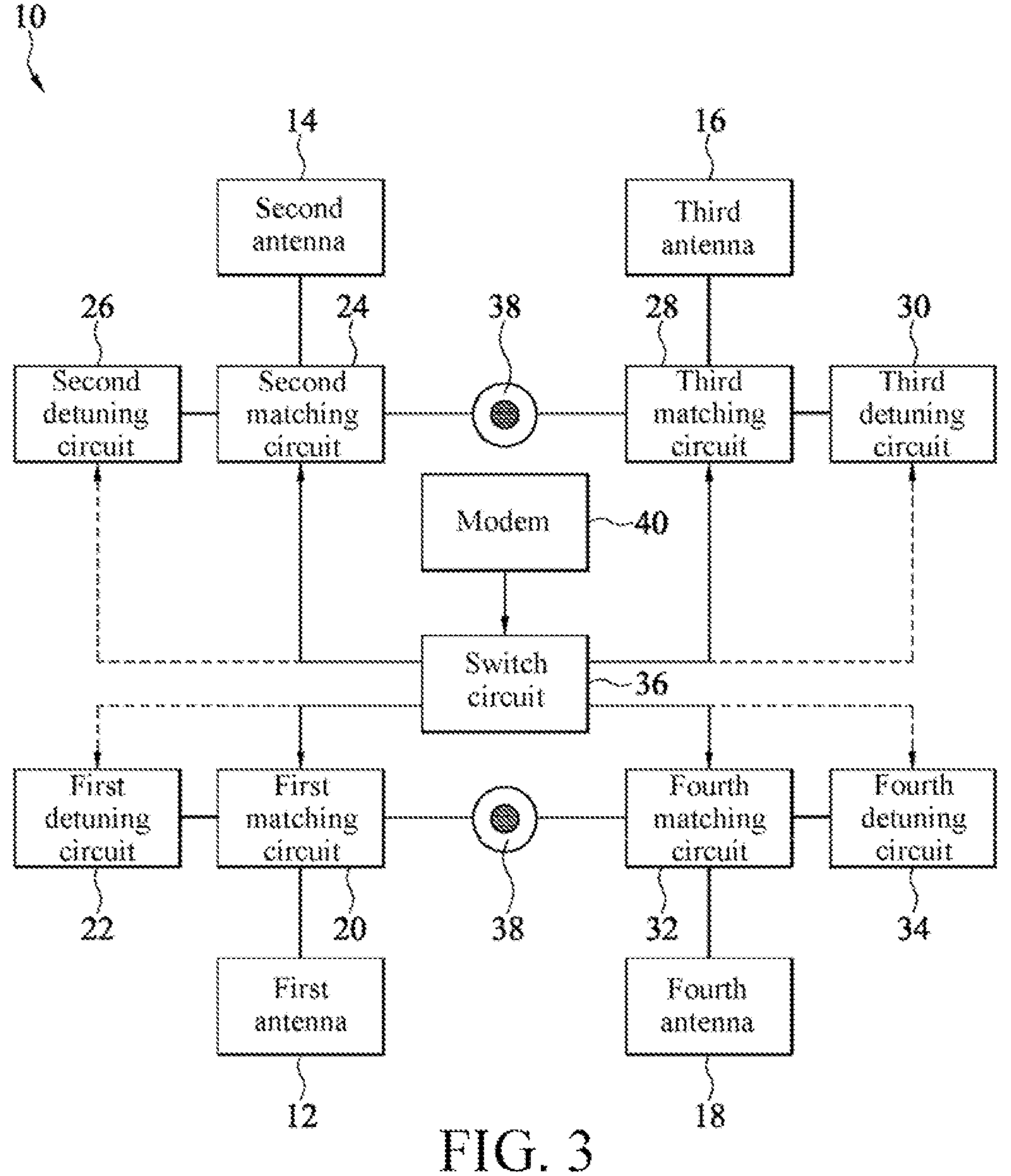
FIG. 3 is a schematic block diagram of a low band antenna device according to an embodiment of the disclosure.

Referring to FIG. 1, FIG. 2, and FIG. 3 together, to control action of the first antenna 12, the second antenna 14, the third antenna 16, and the fourth antenna 18, the low band antenna device 10 further includes a first matching circuit 20, a first detuning circuit 22, a second matching circuit 24, a second detuning circuit 26, a third matching circuit 28, a third detuning circuit 30, a fourth matching circuit 32, a fourth detuning circuit 34, and a switch circuit 36. The first matching circuit 20 is connected to the first antenna 12, the first detuning circuit 22 is connected to the first matching circuit 20, and the first antenna 12 is further connected to a radio frequency signal input/output end 38 through the first matching circuit 20, so that a radio frequency signal is transmitted from the first antenna 12 by the radio frequency signal input/output end 38 through adjustment and matching of the first matching circuit 20, and vice versa. The second matching circuit 24 is connected to the second antenna 14, the second detuning circuit 26 is connected to the second matching circuit 24, and the second antenna 14 is further connected to the radio frequency signal input/output end 38 through the second matching circuit 24, so that the radio frequency signal is transmitted from the second antenna 14 by the radio frequency signal input/output end 38 through adjustment and matching of the second matching circuit 24, and vice versa. The third matching circuit 28 is connected to the third antenna 16, the third detuning circuit 30 is connected to the third matching circuit 28, and the third antenna 16 is further connected to the radio frequency signal input/output end 38 through the third matching circuit 28, so that the radio frequency signal is transmitted from the third antenna 16 by the radio frequency signal input/output end 38 through adjustment and matching of the third matching circuit 28, and vice versa. The fourth matching circuit 32 is connected to the fourth antenna 18, the fourth detuning circuit 34 is connected to the fourth matching circuit 32, and the fourth antenna 18 is further connected to the radio frequency signal input/output end 38 through the fourth matching circuit 32, so that the radio frequency signal is transmitted from the fourth antenna 18 by the radio frequency signal input/output end 38 through adjustment and matching of the fourth matching circuit 32, and vice versa. The switch circuit 36 is connected to the first matching circuit 20, the first detuning circuit 22, the second matching circuit 24, the second detuning circuit 26, the third matching circuit 28, the third detuning circuit 30, the fourth matching circuit 32, and the fourth detuning circuit 34. When the folding screen electronic device 50 is in the close mode, through switching of the switch circuit 36, the first detuning circuit 22 or the fourth detuning circuit 34 and the second detuning circuit 26 or the third detuning circuit 30 receive a disabled signal, so that the corresponding first antenna 12 or the corresponding fourth antenna 18 and the corresponding second antenna 14 or the corresponding third antenna 16 are in the detuned and disabled state. In an embodiment, when the first antenna 12 and the third antenna 16 with the best efficiency are selected in the disclosure to maintain the normal working state, the switch circuit 36 switches the second detuning circuit 26 and the fourth detuning circuit 34, so that the second detuning circuit 26 and the fourth detuning circuit 34 receive the disabled signal, to cause the second matching circuit 24 and the fourth matching circuit 32 to be disabled, so that the second antenna 14 and the fourth antenna 18 are in the detuned and disabled state, to maintain the antenna efficiency when the folding screen electronic device 50 is closed, and resolve a coupling problem when the first casing 52 and the second casing 54 overlap.

In an embodiment, as shown in FIG. 3, the switch circuit 36 is further connected to a modem 40, and the modem 40 generates a control signal to the switch circuit 36, to control action of the switch circuit 36.

Figure 4:
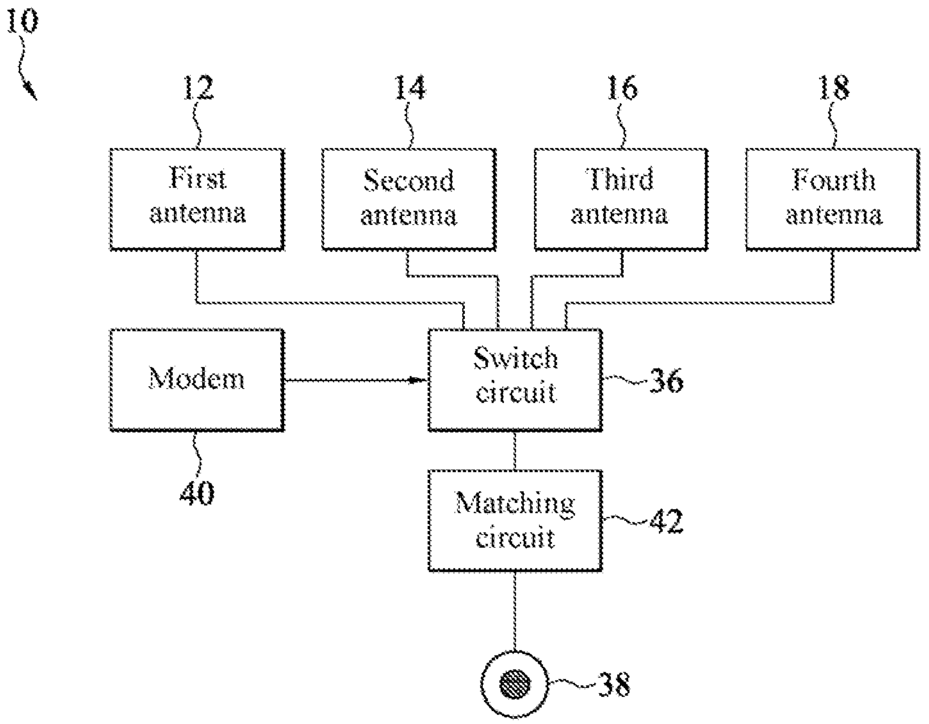
FIG. 4 is a schematic block diagram of a low band antenna device according to another embodiment of the disclosure.

Referring to FIG. 1, FIG. 2, and FIG. 4 together, to control action of the first antenna 12, the second antenna 14, the third antenna 16, and the fourth antenna 18, the low band antenna device 10 further a switch circuit 36, a radio frequency signal input/output end 38, and a matching circuit 42. One end of the switch circuit 36 is connected to the first antenna 12, the second antenna 14, the third antenna 16, and the fourth antenna 18, another end of the switch circuit 36 is connected to the matching circuit 42, and the matching circuit 42 is further connected to the radio frequency signal input/output end 38, to selectively electrically connect the radio frequency signal input/output end 38 to the first antenna 12, the second antenna 14, the third antenna 16, and the fourth antenna 18 through the switch circuit 36. When the folding screen electronic device 50 is in the open mode, through the switching of the switch circuit 36, the first antenna 12, the second antenna 14, the third antenna 16, and the fourth antenna 18 are all electrically connected and maintain the normal working state, so that a radio frequency signal is transmitted from the first antenna 12, the second antenna 14, the third antenna 16, or the fourth antenna 18 by the radio frequency signal input/output end 38 through adjustment and matching of the matching circuit 42 and through the switch circuit 36; otherwise, the radio frequency signal received by the first antenna 12, the second antenna 14, the third antenna 16, or the fourth antenna 18 is inputted into the radio frequency signal input/output end 38 through the switch circuit 36 and the matching circuit 42. When the folding screen electronic device 50 is in the close mode, through the switching of the switch circuit 36, one of the first antenna 12 and the fourth antenna 18 and one of the second antenna 14 and the third antenna 16 are electrically connected and maintain the normal working state, and the remaining first antenna 12 or the remaining fourth antenna 18 and the remaining second antenna 14 or the remaining third antenna 16 are not electrically connected and are in the detuned and disabled state.

Figure 5:
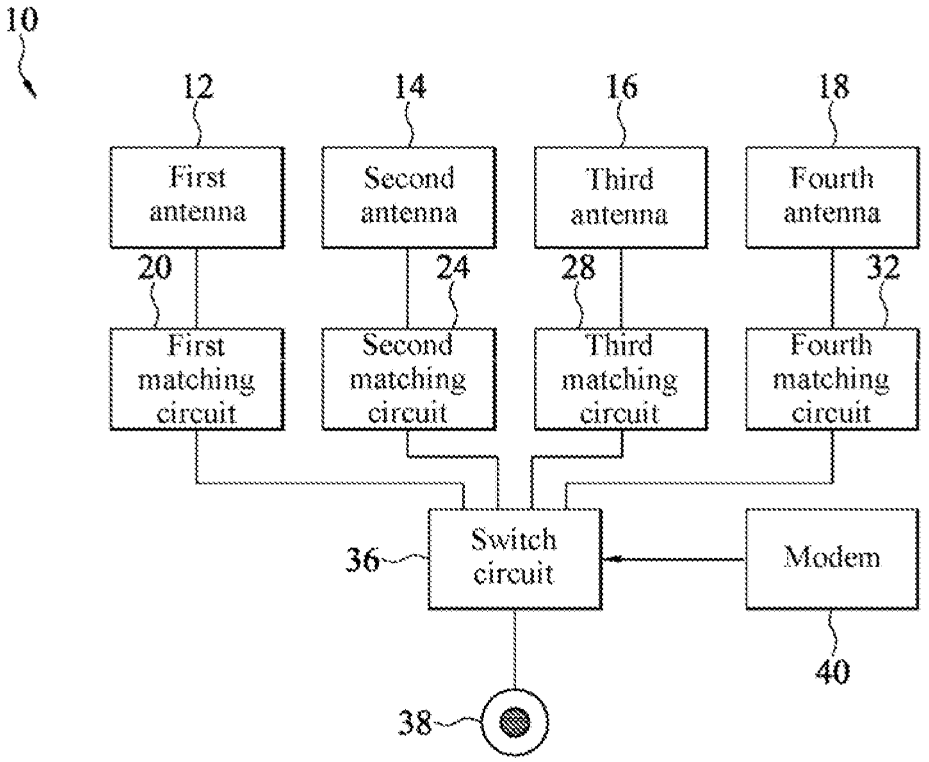
FIG. 5 is a schematic block diagram of a low band antenna device according to still another embodiment of the disclosure.

Referring to FIG. 1, FIG. 2, and FIG. 5 together, the low band antenna device 10 includes a first antenna 12, a second antenna 14, a third antenna 16, a fourth antenna 18, a first matching circuit 20, a second matching circuit 24, a third matching circuit 28, a fourth matching circuit 32, a switch circuit 36, and a radio frequency signal input/output end 38. The first matching circuit 20 is connected between the first antenna 12 and the switch circuit 36, the second matching circuit 24 is connected between the second antenna 14 and the switch circuit 36, the third matching circuit 28 is connected between the third antenna 16 and the switch circuit 36, the fourth matching circuit 32 is connected between the fourth antenna 18 and the switch circuit 36, and the switch circuit 36 is connected to the radio frequency signal input/output end 38, to selectively electrically connect the radio frequency signal input/output end 38 to the first antenna 12, the second antenna 14, the third antenna 16, and the fourth antenna 18 through the switch circuit 36. When the folding screen electronic device 50 is in the open mode, through the switching of the switch circuit 36, the first antenna 12, the second antenna 14, the third antenna 16, and the fourth antenna 18 are all electrically connected and maintain the normal working state, so that the radio frequency signal is transmitted from the first antenna 12, the second antenna 14, the third antenna 16, or the fourth antenna 18 by the radio frequency signal input/output end 38 through the switch circuit 36, and then through the first matching circuit 20, the second matching circuit 24, the third matching circuit 28, or the fourth matching circuit 32 correspondingly; otherwise, the radio frequency signal received by the first antenna 12, the second antenna 14, the third antenna 16, or the fourth antenna 18 is inputted into the radio frequency signal input/output end 38 through the first matching circuit 20, the second matching circuit 24, the third matching circuit 28, or the fourth matching circuit 32 correspondingly, and then through the switch circuit 36. When the folding screen electronic device 50 is in the close mode, through the switching of the switch circuit 36, one of the first antenna 12 and the fourth antenna 18 and one of the second antenna 14 and the third antenna 16 are electrically connected and maintain the normal working state, and the remaining first antenna 12 or the remaining fourth antenna 18 and the remaining second antenna 14 or the remaining third antenna 16 are not electrically connected and are in the detuned and disabled state.

In an embodiment, as shown in FIG. 4 and FIG. 5, the switch circuit 36 is further connected to a modem 40, and the modem 40 generates a control signal to the switch circuit 36, to control action of the switch circuit 36.

Figure 6:
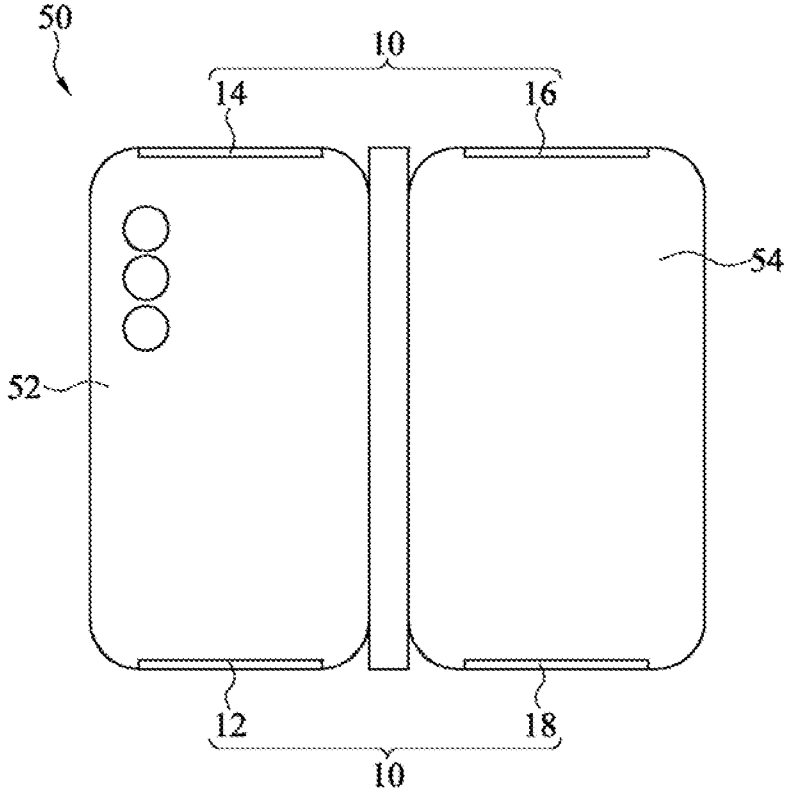
FIG. 6 is a schematic structural diagram of a folding screen electronic device in an open mode according to another embodiment of the disclosure.
Figure 7:
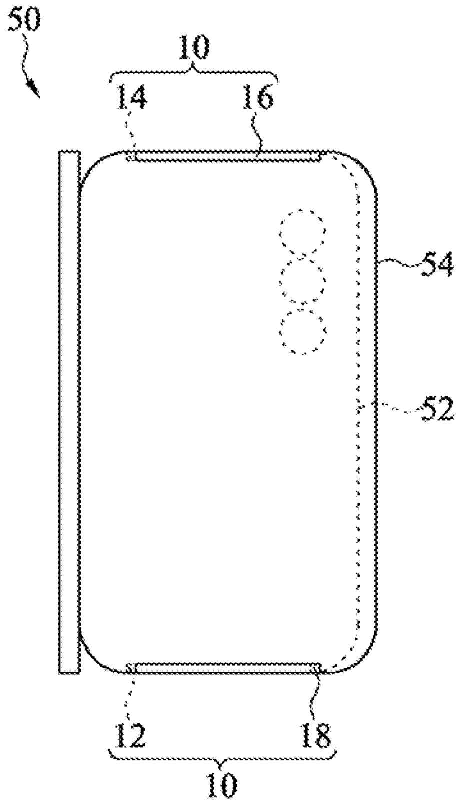
FIG. 7 is a schematic structural diagram of a folding screen electronic device in a close mode according to another embodiment of the disclosure.

In the disclosure, the first antenna 12, the second antenna 14, the third antenna 16, and the fourth antenna 18 are arranged on not only four corners of the folding screen electronic device 50, but also other positions on the first casing 52 and the second casing 54 detachably. Referring to FIG. 6 and FIG. 7, in the low band antenna device 10, the first antenna 12 is located on an inner edge of a lower side edge of the first casing 52, the second antenna 14 is located on an inner edge of an upper side edge of the first casing 52, the third antenna 16 is located on an inner edge of an upper side edge of the second casing 54, and the fourth antenna 18 is located on an inner edge of a lower side edge of the second casing 54, to use the first antenna 12, the second antenna 14, the third antenna 16, or the fourth antenna 18 to receive and transmit a wireless signal. Except for different arrangement positions of the antennas, other action and element connection relationships are the same as those of the embodiments described in FIG. 1 to FIG. 5. For details, refer to the foregoing descriptions, which are not repeated herein.

In an embodiment, the folding screen electronic device 50 is a folding screen mobile phone, a folding screen personal digital assistant, or the like. Any handheld device with a folding screen is covered in the disclosure.

Figure 8:
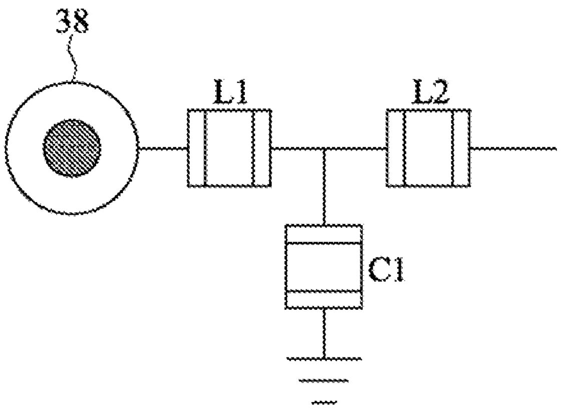
FIG. 8 is a schematic structural diagram of a matching circuit and a detuning circuit that are used in a low band antenna device according to an embodiment of the disclosure.

In an embodiment, referring to FIG. 3 and FIG. 8 together, the first matching circuit 20 and the first detuning circuit 22, the second matching circuit 24 and the second detuning circuit 26, the third matching circuit 28 and the third detuning circuit 30, and the fourth matching circuit 32 and the fourth detuning circuit 34 used in the low band antenna device 10 of the disclosure are composed of passive components such as capacitors and inductors. As shown in FIG. 8, a first inductor L1 is connected in series to a second inductor L2, and a first capacitor C1 is connected in parallel between the first inductor L1 and the second inductor L2, to achieve a detuning effect by adjusting a capacitance value of the first capacitor C1. In addition to FIG. 8, in the disclosure, inductors or capacitors are also used for all three components, and it is not limited that the first inductor L1 and the second inductor L2 are connected in series, and the first capacitor C1 is connected in parallel.

As shown in FIG. 1, FIG. 2, FIG. 6, and FIG. 7, the folding screen electronic device 50 has two use modes: an open mode and a close mode. A use scenario of the close mode is a general use mode, which is mainly convenient for calling and carrying. Therefore, the low band antenna device 10 in the folding screen electronic device 50 only uses two antennas, which is a 2*2 MIMO structure. A use scenario of the open mode is a high-speed use mode, mainly watching videos and playing games, which requires more transmission throughput. In this case, the low band antenna device 10 in the folding screen electronic device 50 uses four antennas, which is a 4*4 MIMO structure.

In conclusion, in order to improve the transmission speed of mobile devices and increase the number of mobile phone antennas, the disclosure provides a low band antenna device, which upgrades the low band antenna to a 4*4 MIMO state, and uses the MIMO technology to maximize the throughput, so as to increase the mobile phone transmission throughput, meet the increasing bandwidth requirements, and optimize the user experience.

The foregoing embodiments are merely for describing the technical ideas and the characteristics of the disclosure, and are intended to enable those skilled in the art to understand and hereby implement the content of the disclosure. However, the scope of claims of the disclosure is not limited thereto. In other words, equivalent changes or modifications made according to the spirit disclosed in the disclosure shall still fall into scope of the claims of the disclosure.

What is claimed is:

1. A low band antenna device, arranged on a folding screen electronic device, wherein the folding screen electronic device comprises a first casing and a second casing that are foldable, and the low band antenna device comprises:

a first antenna, located on the first casing;

a second antenna, located on the first casing and kept separated from the first antenna;

a third antenna, located on the second casing, and corresponding to the second antenna;

a fourth antenna, located on the second casing and kept separated from the third antenna, wherein the fourth antenna corresponds to the first antenna, wherein when the folding screen electronic device is in an open mode, the first antenna, the second antenna, the third antenna, and the fourth antenna all maintain a normal working state; and when the folding screen electronic device is in a close mode, one of the first antenna and the fourth antenna and one of the second antenna and the third antenna maintain the normal working state, and the remaining antennas are in a detuned and disabled state;

a first matching circuit, connected to the first antenna;

a first detuning circuit, connected to the first matching circuit;

a second matching circuit, connected to the second antenna;

a second detuning circuit, connected to the second matching circuit;

a third matching circuit, connected to the third antenna;

a third detuning circuit, connected to the third matching circuit;

a fourth matching circuit, connected to the fourth antenna;

a fourth detuning circuit, connected to the fourth matching circuit; and a switch circuit, connected to the first matching circuit, the first detuning circuit, the second matching circuit, the second detuning circuit, the third matching circuit, the third detuning circuit, the fourth matching circuit, and the fourth detuning circuit, wherein when the folding screen electronic device is in the close mode, through switching of the switch circuit, the first detuning circuit or the fourth detuning circuit and the second detuning circuit or the third detuning circuit receive a disabled signal, so that the remaining first antenna or the remaining fourth antenna and the remaining second antenna or the remaining third antenna are in the detuned and disabled state.

2. The low band antenna device according to claim 1, wherein both the first antenna and the second antenna are respectively located on inner edges of two outer corners of the first casing; and both the third antenna and the fourth antenna are respectively located on inner edges of two outer corners of the second casing.

3. The low band antenna device according to claim 1, wherein both the second antenna and the first antenna are respectively located on inner edges of an upper side edge and a lower side edge of the first casing; and both the third antenna and the fourth antenna are respectively located on inner edges of an upper side edge and a lower side edge of the second casing.

4. The low band antenna device according to claim 1, wherein the first antenna is further connected to a radio frequency signal input/output end through the first matching circuit; the second antenna is further connected to the radio frequency signal input/output end through the second matching circuit; the third antenna is further connected to the radio frequency signal input/output end through the third matching circuit; and the fourth antenna is further connected to the radio frequency signal input/output end through the fourth matching circuit.

5. The low band antenna device according to claim 1, wherein the switch circuit is further connected to a modem, and the modem generates a control signal to the switch circuit, to control action of the switch circuit.

6. The low band antenna device according to claim 1, wherein the folding screen electronic device is a folding screen mobile phone or a folding screen personal digital assistant.

* * * * *